Patented Oct. 14, 1941

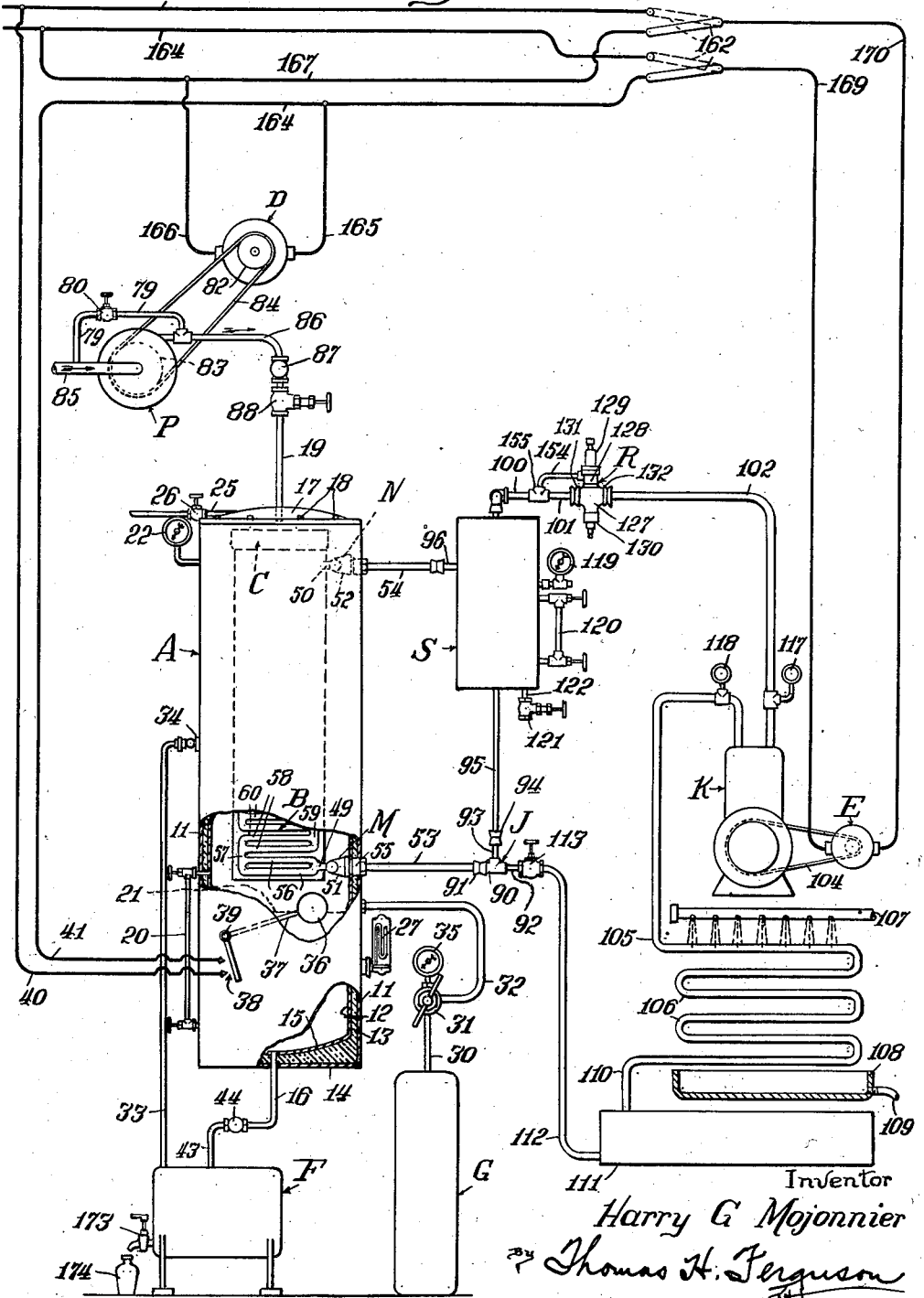

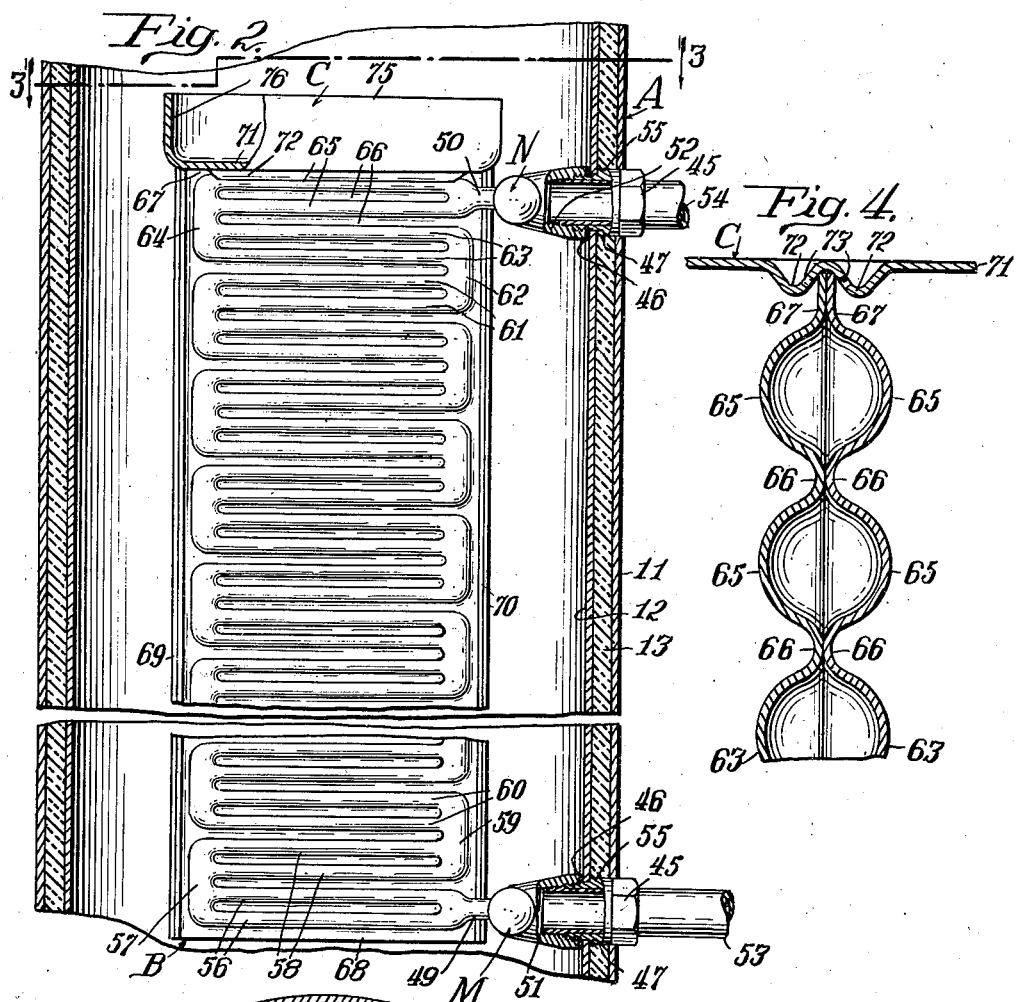
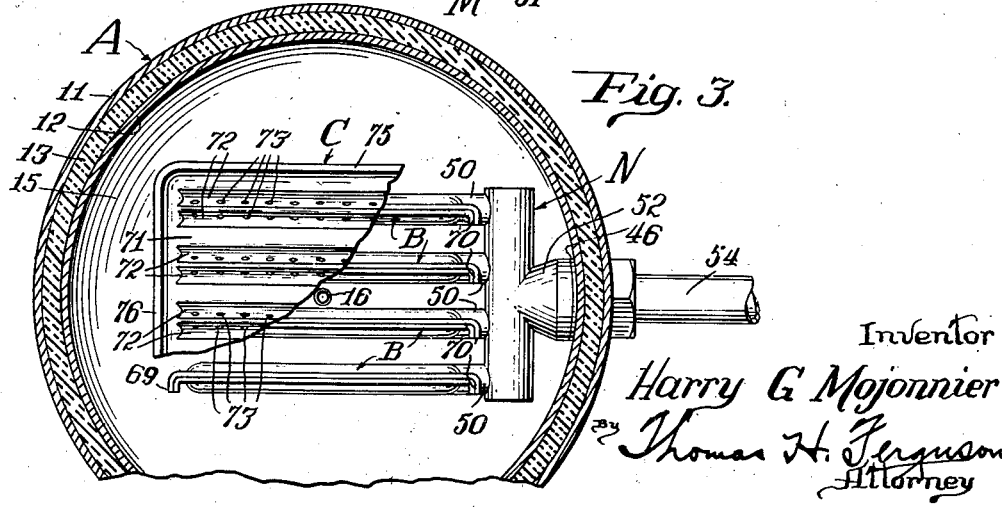

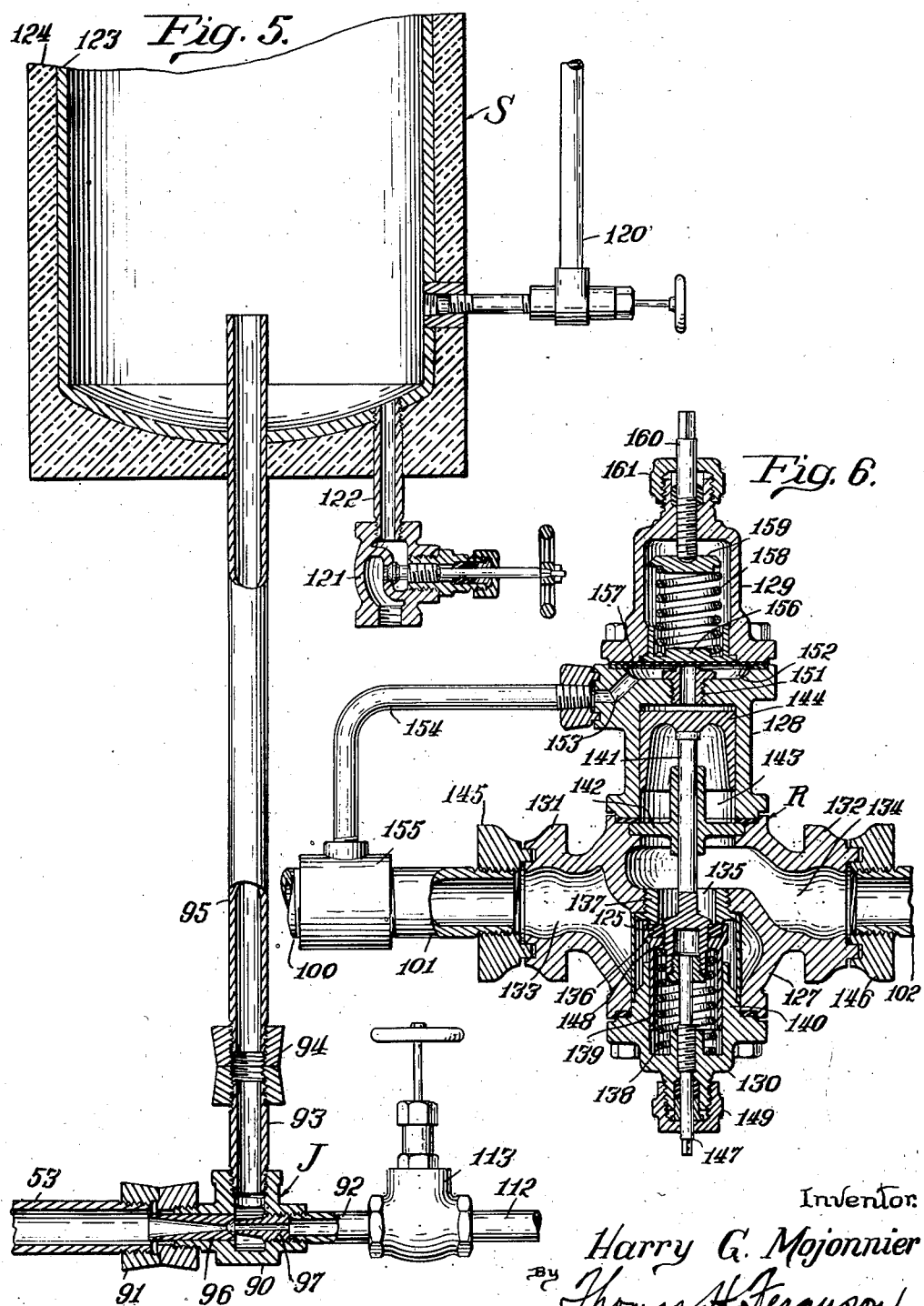

2,259,263

UNITED STATES PATENT OFFICE 2,259,263

APPARATUS FOR TREATING LIQUIDS

Harry G. Mojonnier, Oak Park, Ill., assignor to Mojonnier Bros. Co., a corporation of Illinois Application May 10, 1939, Serial No. 272,802

4 Claims. (Cl. 62—141)

The present invention relates to apparatus for treating liquids and more particularly for cooling and carbonating liquids.

One object of the invention is to provide a novel apparatus of the class mentioned in which the liquid will be effectively cooled and carbonated. This is preferably accomplished by cooling the same as it passes down in film form through an atmosphere of carbonic acid gas under pressure. Thus, as the liquid cools, it takes up more of the gas and this action is continued until the desired low temperature and maximum gas absorption is obtained.

Another object is to provide a novel apparatus of the class mentioned wherein the heat exchange medium used to cool the liquid as it is being carbonated may be one that is readily vaporizable at ordinary temperatures. When such a medium is used the medium, when in the form of gas, may be selectively controlled as to pressure in order to give desired temperature differentials and thus the apparatus may be quickly and effectively operated to provide the desired cooling and carbonation.

Viewed in another way, I desire to produce, and have produced, novel apparatus of the class mentioned wherein improved action is obtainable by varying the relation to each other of several factors, which factors include the volume of liquid being treated, the available gas pressure, the area of the filming and cooling surface over which the liquid flows, the time period consumed in passing over that area and the degree of refrigeration.

There are certain controls also in view by which the liquid supply and supply of refrigerant may be quickly opened up or cut off.

These and other objects and features of the invention will be best understood upon reference to the following detailed description taken in connection with the accompanying drawings while the scope of the invention will be particularly pointed out in the appended claims.

In said drawings, Fig. 1 is a diagram of apparatus and suitable connections constructed and arranged in accordance with the present invention, a small portion of the tank of the apparatus being shown in a central vertical section. Fig. 2 is a side elevation of the treating elements located in the tank, in conjunction with portions of the supporting tank wall, shown in section. Fig. 3 is a sectional plan view of the structure of Fig. 2, the tank being shown in section indicated by the line 3—3 of Fig. 2 and the distributor being partly broken away. Fig. 4 is a detailed view illustrating in section the way in which the upper end of one of the treating elements of the structure of Figs. 2 and 3 fits into and cooperates with the bottom of the distributor. Fig. 5 is a central vertical section, in part, of the surge tank and the injector and associated piping of the refrigerating part of the apparatus. And Fig. 6 is a central vertical section of a back pressure valve used in association with piping between the surge tank and the compressor of the refrigerating equipment. Throughout these views like characters refer to like parts.

The new apparatus may be variously constructed. In the embodiment illustrated, there is a pressure tank A in which the cooling and carbonating of the liquid to be treated takes place. Within the tank are the heat exchange elements B of which there may be any suitable number, depending upon the conditions and requirements of the particular installation. In the present instance four such elements B are shown. In operation the liquid to be treated is fed to the upper ends of these elements so as to flow quietly down over their exteriors in thin evenly distributed films. The impregnating gas which is supplied to the interior of the tank, because of the film-like sheets or streams, obtains good access to all parts of the liquid. At the same time the liquid is descending it is being gradually cooled upon the elements B. As it cools it takes up the gas more completely. So the progressive cooling and the carbonating assist each other. When the liquid reaches the lower ends of the elements B it is sufficiently cooled and carbonated. To provide the maximum carbonation, the temperature is lowered down to a point as near freezing as may be without freezing the water into ice upon the lower ends of the elements B. When the desired cooling and carbonating is completed, the product liquid falls into the lower portion of the tank A, which portion constitutes a storage chamber in which the product may be held as a supply to be drawn on as desired.

The invention is particularly useful in the cooling and carbonating of water. It will therefore be described in that connection.

The pressure tank A may take different forms, but, preferably, it is an upright tank having an outer shell 11 and an inner shell 12, which shells, together with intervening heat insulation 13, form the peripheral wall of the tank. At the bottom the outer shell 11 is welded to a circular plate 14, while the inner shell 12 is similarly attached to an arcuate bottom plate 15. The latter is dished as shown, and thus provides a low center point, from which the outlet pipe connection 16 extends. The top 17 of the tank is preferably composed of a single dished plate which is secured at its periphery by bolts or screws 18 to the top of the wall of the structure. An inlet pipe 19 is passed through the center of the top or head 17, and extends a short distance within the tank. The bottom of the tank may rest upon any suitable support. It is also preferably provided with a suitable water gage 20 to show the level 21 of the collected cooled and carbonated liquid in the lower portion of the tank. Preferably, too, the tank A is provided with a pressure gage 22 suitably connected to the upper portion of the tank. A snifter outlet pipe 25 controlled by a valve 26 is also located at the top of the tank in position to discharge the light gases and air which will collect from time to time in the top of the tank. The snifter pipe 25 may be opened to atmosphere from time to time by a manual operation of the valve 26. A thermometer 27 may also be connected to the tank and placed in communication with its interior so as to show the temperature of the liquid within the lower portion of the tank. As before noted, the lower portion of the tank constitutes a collecting basin from which the liquid may be withdrawn through the pipe 16 under suitable control. The liquid collected in the bottom of the tank A, under the assumption that we are to use the apparatus for the cooling and carbonating of water, will be cooled and carbonated water.

The carbonic acid gas which is supplied to the tank may come from any suitable source. In the present instance it is brought from an ordinary supply drum G through a pipe 30, regulating valve 31 and pipe 32 into the interior of the tank A. The gas pressure in the drum G is relatively high and the regulator 31 may be set by hand to supply the gas within the tank at a desired lower pressure. Different ways of controlling the carbonic acid gas both as to temperature and pressure are known and may be used, as the judgment of the designer may dictate. The single regulator 31 merely generically indicates suitable regulation to bring down the gas pressure to a point where it may be used with the elements B to advantage. Suitable pressure gages, of which one, designated 35, is shown, are commonly employed with the pressure regulator 31.

A small pipe 33, similarly communicating with the tank A at the connection 34, leads from the tank to a filler or other like apparatus F, in some portion of which gas under pressure is required for its operation. This may be an equality of pressure, or pressures bearing a different ratio. Where such pressure is not required in the adjunctive device, then the pipe 33 may be removed or otherwise rendered functionless. Where removed, the opening at 34 may be closed by a screw-plug or the like.

The float controlled switch within the lower portion of the tank A, comprises a float 36 which rides upon the liquid, and which, through a supporting arm 37, operates an electric switch 38 which is suitably supported by the tank wall and has pivotal bearing 39. This switch is preferably a mercury switch, although the desired functions may be realized in structures wherein mercury is not the interconnecting element. As illustrative of both kinds of float controlled switches, see the following United States Patents: No. 361,968, Olsen, dated April 26, 1887, No. 431,885, Focer, dated July 8, 1890, and No. 2,149,619, Mojonnier, dated March 7, 1939.

Again, in lieu of a float controlled switch, the Warrick depth control device might be used. Such device is disclosed in United States Patent No. 1,979,127, granted to Mr. Warrick on October 30, 1934.

From the switch 38, conductors 40 and 41 extend through a conduit, or otherwise, to points where the same are connected into circuit with other control apparatus, as will be pointed out more fully hereinafter.

Preferably, the outlet pipe 16 is provided with an extension pipe 43 which runs to the filler, or other apparatus F, which is to be supplied with the cooled and carbonated water. Preferably, also, a valve 44 is located in the pipe line (16, 43) extending from the storage end of the tank A to the filler F.

The heat exchange elements B are mounted within the tank A and are furnished with suitable connections for admitting and discharging a refrigerant. They are positioned directly below a distributor C which is supplied with water through the pipe 19. From the distributor the water passes down over the outer surfaces of the elements, coming, during such downward flow, into intimate contact with the carbonic acid gas within the tank. As the water passes down over the heat exchange elements B, its heat is given up to the refrigerant passing through the elements.

It seems quite unnecessary to illustrate and describe the cooling elements B with any degree of detail, since they are substantially the same in design and construction as those shown and described in United States Patent No. 2,040,947, granted May 19, 1936, to O. W. Mojonnier et al., the only differences being in dimensions. In the present case the elements are narrow and long, the length being vertical in the finished apparatus. As clearly disclosed in the patent, each of the elements B is made up of two separate oppositely embossed metal sheets, fitted together and preferably welded at meeting points to form the finished element, the same having interior passages for the flow of the refrigerant and smooth undulating outer surfaces over which the water will flow in film-like streams.

The elements B are provided with manifolds, there being in the present embodiment of the invention two, an inlet manifold M and an outlet manifold N. These manifolds are parallel to each other and extend transversely of the planes of the elements B, and, for each element, each manifold is provided with a branch, the branches 49 being associated with the manifold M and the branches 50 with the manifold N. These branches are permanently secured to the associated elements B, as by welding. Likewise, each manifold is provided with an outwardly extending branch, the branch 51 being associated with the manifold M and the branch 52 with the manifold N. These outer branches are integral with the associated manifolds and are interiorly threaded at their outer ends for the reception of inlet and outlet pipes and associated coupling members. Because of the way in which the manifolds are located with respect to each other and with respect to the heat exchange elements, a sturdy unitary structure is provided. Obviously, these units may be made up in quantities and positioned in the tanks from time to time, as required.

When it comes to placing a heat treating unit of the kind just described, in the tank A, suitable openings must be provided in the wall of the latter to allow for the passage of the inlet and outlet pipes and the associated coupling members corresponding to the branches 51 and 52 of the manifolds. Obviously, such unit must be placed in the tank before putting the top 17 in place. With the top out of the way, it is possible to readily lower one of these multi-element units down into the tank and secure it in place.

When the branches 51 and 52 of the manifolds M and N, respectively, are brought opposite the corresponding openings in the tank wall, then they are permanently connected to the tank wall. This is done by coupling members, quite independently of the connection of the inlet and outlet pipes 53 and 54 themselves. After the units are thus firmly mounted in place in the tank, then the inlet and outlet pipes may be readily screwed into place.

Since both inlet and outlet connections are the same, it will suffice to describe one only. That associated with outlet manifold N is therefore chosen for this purpose. As clearly shown, the branch 52 of that manifold has two sets of threads on its interior. These are cut in interior cylindrical walls of different diameters. The innermost threads cooperate with exterior threads upon the end of the pipe 54. The outer set of threads of the branch 52 cooperate with exterior threads upon the innermost portion of the coupling member 55. The latter is in the form of a sleeve having a hexagonal or other shaped head 45 formed upon it and made integral with it. As this head is turned with a wrench, the sleeve may be screwed into and out of the branch 52, depending on the direction in which it is turned. A gasket 46 surrounds the sleeve and bears against the outer end of the branch 52 and the adjacent inner shell 12 of the tank wall. On the opposite side of the shell 12, a shoulder 47 upon the coupling member 55 presses against the shell 12, as the sleeve member 55 is screwed into the member 52. The outer shell 11 of the tank wall has a slightly larger hole in it than the inner shell 12. This is necessary in order to permit the coupling member 55 to pass through it, the outer unthreaded portion of this member being of larger diameter than the inner threaded portion, as clearly shown. Thus, the coupling member 55 and the manifold branch 52 are firmly secured together when the sleeve is screwed home. The pipe 54 passes freely through the coupling 55 and can be screwed home into engagement with the branch 52 or removed by unscrewing as desired without moving the sleeve member 55. In case of leakage, the head 45 of the member 55 need only be screwed a little more tightly into the member 52 to stop the leak.

The particular way of securing these branches 51, 52 by means of the couplings 55 may, of course, be replaced by other ways. The way shown, however, has been found very satisfactory in service.

In the structure made up as illustrated, the securing of the branches 51, 52 to the tank wall fixedly supports the nest of heat exchange elements and at the same time when the pipes 53 and 54 are screwed home the interiors of the heat exchange units are open for the entrance and exit of the heat exchange medium.

It will be seen that the path for the refrigerant, which ordinarily enters through the branch 51 of manifold M and departs through the branch 52 of manifold N, is a divided path, and each division is serpentine in its course. Thus, a refrigerant entering at 51 will pass through manifold M, then through the branches 49 to the associated elements B, then up through these elements in parallel and out through branches 50, manifold N and branch 52. The path through each element B will extend from the channel of branch 49 through parallel cross channels and connecting end channels formed by the opposed bulges and depressions in the constituent plates of the element. Following these bulges, the path may be traced (more particularly in Fig. 2) from branch 49, through the parallel cross channels bounded by opposing bulges 56, the end channel bounded by bulges 57, the parallel cross channels bounded by bulges 58, the end channel bounded by bulges 59, the parallel cross channels bounded by bulges 60, and so on, back and forth, until the parallel cross channels bounded by bulges 61 are encountered, then on through the end channel bounded by bulges 62, the parallel cross channels bounded by bulges 63, the end channel bounded by end bulges 64, and the parallel cross channels bounded by bulges 65, to the outlet branch 50.

The way in which the bulges and depressions are formed will be clear from a consideration of Fig. 4, wherein the top two parallel cross channels bounded by bulges 65 are shown. As there shown, valleys 66 lie between the bulges or ridges, on each side of the element. Above the uppermost bulges 65, the plates come together in coplanar portions 67. Similarly, at the bottom of the element the constituent plates meet in coplanar portions 68. Likewise, along the long edges of the element, the constituent plates are brought together in meeting portions 69 and 70. In order to stiffen each element B, these meeting edges 69 on the one hand and 70 on the other, are bent into flanges which extend outward in each instance from the plane of the element. This is done without separating the meeting faces. These portions of the plates of element B which come together and contact each other, namely, those which form the valleys between the bulges and those which constitute the outer bounding edge of the element, are secured together, preferably by welding. Thus, there are coplanar portions and opposite bulging portions, and it is by securing the plates together at their coplanar portions that the element is made up.

Obviously, the paths for the refrigerant through the cooling element might be otherwise provided, but the structure herein illustrated has been found very satisfactory for the several uses previously indicated.

As clearly shown in Fig. 4, the bottom 71 of the distributor C is provided with a series of parallel depressions or grooves 72, arranged in pairs and each pair providing a cross sectional outline having the general form of the letter W, there being one such pair for each element B. When analyzed, it will be seen that each pair of grooves consists of a central inverted V-shaped groove and the two outer upright V-shaped grooves 72. The walls of the inverted central groove, or, put in another way, the inner walls of the outer grooves 72, have a series of openings 73 which extend through them and in position to furnish liquid to opposite sides of the associated element B. These openings 73 are preferably small holes drilled through the material and arranged in opposed relation, as clearly shown in Fig. 3.

With this arrangement, the water passing from distributor C on to elements B, takes the form of two quite evenly distributed films of substantially equal thicknesses, and, when once formed, these films continue in their downward flow as films without interruptions until after they pass from the lower end of the element. There the films flowing down the opposite surfaces of any given element, unite to form a film-like stream of increased thickness which flows gently and quietly into the body of cooled and carbonated liquid which forms the pool of collected product liquid in the storage chamber of the tank. The distributor C has side walls 75 and end walls 76, and rests, when in position, directly upon the upper edges of the elements B, in the manner illustrated in Fig. 4.

Of course, if desired, the distributor C may be more firmly secured to the upper ends of the elements B or supported independently of the elements, as has been done heretofore in various coolers. But, in any case, it should be possible to clean the elements B and the interior of the tank A. This means that the top 17 should be removable. In the illustrated embodiment, the associated pipes can readily be disconnected from the top and then the top can be removed from the tank proper. When the top 17 is removed, then access may be had to the distributor, the treating elements and the inner surfaces of the composite tank wall. The distributor C may be removed and cleaned. Following this, the treating elements B and the inner surfaces of the tank wall may be cleaned by using a long brush (or a long handled brush) or by pouring an acid or other cleansing solution over them. Where a brush is used, a vigorous scrubbing is desirable in order that a good job of cleaning may be done. In order to obtain the latter, the elements B are spaced a substantial distance apart and are preferably in substantially parallel relation to each other. It is thus possible to reach down into the tank between and around the elements and thoroughly scrub them as well as the interior of the tank.

In the cooling and carbonating of water, it is preferable to employ a pump, such as pump P, and to control its operation through the control of a driving electric motor D. The pump and motor may be variously constructed and controlled. In the present disclosure these mechanisms are shown diagrammatically and the gearing between the two is represented by a driving pulley 82 upon the motor D, a driven pulley 83 upon the pump P and an interconnecting driving belt 84. Thus power is transmitted from the motor to the pump. The latter has an intake pipe 85 which may receive its supply from any suitable source, and an outlet pipe 86 which connects through a check valve 87 with pipe 19 which enters the top of the tank, the continuous pipe line (86, 19) being further controlled by a manual valve 88 by which communication between the pump and tank may be opened or closed as desired, and preferably to the degree desired. As the pump P operates it furnishes water to the distributor C of the tank.

Preferably, the pump P is one which operates at a constant speed and, being driven by a constant speed motor D, delivers a constant volume of water per unit of time. Of course, for a given set of conditions one rate of flow may suffice while for different conditions a different rate may be necessary or desirable. In the latter event, the motor speed may be changed, or the same motor and pump used but with a different belt and pulleys, or again a portion of the water may be by-passed about the pump.

The by-pass arrangement is illustrated in Fig. 1. There, as shown, the intake pipe 85 is connected directly to the delivery pipe 86, by a by-pass pipe 79 which has its free passageway controlled by a manual valve 80.

Since the liquid supplied to the tank is to be cooled as well as carbonated, some provision must be made for supplying a refrigerant to the heat exchange elements B. In the present instance a refrigerating cycle employing ammonia is illustrated. The ammonia passes from the inlet pipe 53 through manifold M, the several heat exchange elements B, and manifold N to the outlet pipe 54. Before entering inlet pipe 53 it passes through an injector J.

As shown, the injector J comprises a body 90 having an outlet coupling 91 by which its outlet is secured to the pipe 53. It has two inlets. One of these is connected to pipe nipple 92 which is in the main line coming from the liquid ammonia supply. The other inlet is connected to a nipple 93 which is connected by coupling 94 to pipe 95 which leads from the lower end of the surge drum S. Within the injector body 90 is a throat member 96 and an orifice member 97. The high pressure ammonia in liquid form enters from pipe 92 into the orifice member 97 and then passes on through the expanding throat of the member 96. As it emerges from the orifice, it is reduced in pressure to that existing in the heat exchange elements. To illustrate, the liquid ammonia entering the orifice may have a pressure of 180 pounds per square inch and a temperature of 90° Fahrenheit and upon leaving the orifice a pressure of 45 pounds per square inch and a temperature of 30° Fahrenheit. This drop in temperature is accomplished through the evaporation of a certain percentage of ammonia directly as it leaves the orifice. In the illustration given, this evaporation may amount to from 10 to 15 percent. Therefore, beyond the orifice there is a mixture of gas and liquid ammonia which travels through the pipe 53 to the evaporator intake manifold M. The mechanical force resulting from the expansion which occurs at the outlet of the orifice plus the force of the liquid emerging from the orifice constitutes a force sufficient to cause the refrigerant to travel upward through the cooling elements of the evaporator. This pressure is not a high pressure, perhaps not exceeding a pound or two.

At the same time that these changes are occurring in the main refrigerating cycle, a certain amount of ammonia is traveling through the auxiliary path through the surge drum S. It will be seen that the ammonia which passes from the cooling elments B will pass through pipe 54 and nipple 96 will enter the surge drum S as a mixture of gas and liquid. In the surge drum the liquid will drop to the bottom of the drum and be recirculated through the pipe 95 and injector J while the gas in the drum will pass on to the compressor.

On its way to the compressor, the gas passes through pipes 100 and 101 to regulator R and thence through pipe 102 to the intake of the compressor K. The latter is driven by an electric motor E by means of a driving belt 104 or other gearing connection. Upon receiving the gas, the compressor compresses it and forces it as a compressed gas through pipe 105 to the coils of a condenser 106. Cooling water is supplied to the condenser through a spray pipe 107 and after it has passed over the coils, it is collected in a pan 108 beneath the coils. From the pan 108 the used water is carried off through pipe 109 to a suitable waste outlet. As the condensed vapor is cooled within the coils of the condenser 106, it is liquefied and passes as a liquid down through pipe 110 to a receiving tank 111. From the latter is passes upward through a pipe 112, valve 113 and the nipple 92 to the injector J. As the liquid ammonia passes through the injector it changes in pressure and temperature as before explained, taking up heat from the liquid passing over the evaporator elements B and cooling the same.

For convenience in observing pressure differences between the high and low sides of the compressor K, pressure gages 117 and 118 are provided, the gage 117 in the low pressure pipe 102 and the gage 118 in the high pressure pipe 105. Likewise the surge drum S is provided with a pressure gage 119, an ammonia level gage 120 and a valve 121 located in a clean-out or drain pipe 122. The wall of the drum S is also preferably insulated, there being the drum wall proper, designated 123, and an outer coating of insulation 124. The valve 113 in the ammonia line leading to the injector is used to regulate the flow of compressed liquid ammonia to the injector.

It might be stated here that a fixed charge of a refrigerant is placed in the system. The amount carried is what is known as a "low side charge" and this charge is so regulated that when all of the liquid ammonia is on the low side, that is, beyond the compressor J, the level of liquid in the surge drum S will come within the range of the gage glass 120.

The regulating valve R may be variously constructed. Examples of such valves are disclosed in the following United States patents: No. 833,062, Krichbaum, dated October 9, 1906, and No. 1,141,975, Osborne, dated June 8, 1915.

A preferred valve construction for the regulator valve R is illustrated more particularly in Fig. 6. As there shown, the valve includes a main body 127, an intermediate body 128, a hollow top member or cap 129 and a bottom 130. The body 127 has flanges 131 and 132 by which, through the agency of coupling members 145 and 146, it is connected to the suction line pipes 101 and 102 respectively. Within are chambers 133 and 134 which are adapted to communicate with each other through passageway 135 whenever valve 136 is moved from its seat 137. A cushion 125 on the valve 136 cooperates with an annular rim on the seat 137. Whenever valve 136 is seated, the passage between pipes 101 and 102 is closed. A coiled compression spring 138 lies within a cylindrical skirt 139 on the valve and acts between the valve 136 and the bottom 130 of the valve body. As shown, the skirt 139 rides freely up and down within the cylindrical wall 140 of the member 130. The spring 138, being compressed, tends to move the valve into closed position. The valve 136 is provided with an upwardly extending stem 141 which passes through a guiding web member 142, firmly held between the body members 127 and 128, into a cylindrical chamber 143 in member 128 where it engages the under side of a piston 144. When gas under pressure is admitted to the cylindrical chamber 143 above the piston 144, it tends to move the piston 144 and valve 136 downward against the compression of the spring 138. When the downward force exceeds the upward force, the valve 136 is opened and the passage between pipes 101 and 102 is open.

The downward movement of the valve 136 is limited by an adjustable stop member 147. The upper end of this member enters an opening 148 formed in the under side of the valve 136. When the valve reaches its lowest position, it engages the upper end of member 147. The latter is really a rod which is threaded through a properly threaded opening in the lower body member 130. By screwing the rod in or out, its position as a stop member is shifted with a resulting variation in the throw of the valve. A suitable gland 149 closes the connection around the lower end of the rod 147. A squared end enables this rod to be readily turned to vary its adjustment.

The admission of gas under pressure to the upper side of the piston 144 is controlled by a diaphragm valve cooperating with a port in port member 151. The latter is fitted into an opening in the top wall of the body member 128, and when the diaphragm valve is raised, places the upper portion of the cylindrical space 143 into communication with a chamber 152 lying below the valve and surrounding the port member 151. The chamber 152 is at all times in open communication with the interior of the pipes 100 and 101. This means that the ammonia gas within the surge tank S will be in direct communication with the under side of the diaphragm valve. This communication is established through passage 153, cut in the upper portion of the body member 128, and pipe 154 which is coupled at one end to the body member 128 and at the other end to the pipe line including pipes 100 and 101 and the pipe connection 155.

The diaphragm valve includes a metal cup 156 which rests upon a diaphragm 157. The latter is held at its periphery between the body members 128 and 129. The walls of the cup 156 fit within a circular opening in the bottom of the member 129. A coiled compression spring 158 enters the cup 156 and bears against the cup bottom. This is at its lower end. At its upper end it bears against an adjustable head 159. The latter has a stem 160 which passes through an opening in the upper cap member 129 and a gland 161 serves to maintain a tight joint, just as in the case of the gland 149 associated with the stem 147. The outer end of the stem 160 is squared so as to permit of its easy turning to adjust the position of the head 159 and the pressure of the spring 158. Obviously, the stem 160 has threaded engagement with the opening in the top of the cap member 129 through which it passes. The spring 158 presses down on the cup 156 and when gas under pressure enters the chamber 152 it exerts an upward pressure upon the diaphragm 157 and thence upon the cup 156 and spring 158. When the diaphragm valve opens, due to the gas pressure exceeding the spring pressure, gas under pressure will flow through the port in port member 151 and will, by acting on the piston 144, oppose the action of the spring 138 upon the main valve 136. When the gas pressure is sufficient, valve 136 will be opened and the pressures in the pipes 101 and 102 will be sufficiently equalized. When this occurs the springs will operate to close both the main and pilot valves. By properly adjusting the compression of the spring 158, the desired back pressure in the surge tank S and in the upper portions of the heat exchange elements can be maintained. The function of the spring 138 is to yieldingly hold the valve 136 in closed position. Normally the pressure in passage 133 is higher than the pressure in passage 134 and suffices to keep the valve 136 upon its seat, but at certain times in the operation of the device this differential does not exist. Then the spring 138 comes into play to keep the valve closed.

Turning now to a consideration of the electrical control circuits, it will be noted that the electric switch 38 which is controlled by the float 36 in the collecting basin of the tank A, controls a circuit for the electric motor D so as to operate the pump P whenever it is necessary to supply additional water to the tank. In the arrangement shown, it is also provided that the motor E, which drives the compressor K, may be continuously operated or operated under the control of the switch 38, as desired. To change from continuous operation to controlled operation, it is only necessary to change connections by throwing a manual switch 162. When the latter switch is in the full line position of Fig. 1, then the motor E is under the direct control of the switch 38, and, no matter which position the switch 162 is in, the pump motor D is under the control of the switch 38. If the hand switch 162 be thrown to the dotted position of Fig. 1, then the motor E is placed in permanent circuit with the supply leads 163, 164 and is continuously operated. When the latter connection is established, the circuit from supply wire 164 extends through one arm of the switch 162 and wire 169 to one terminal of the motor E, and the return circuit passes from the other terminal of the motor E through wire 170 and the other arm of the switch 162, to supply lead 163.

Assuming that the hand switch 162 is in the full line position, then the circuits by which the motors D and E are controlled by the switch 38 may be readily traced. The circuit for motor D may be traced from supply lead 163 through conductor 40, contacts of switch 38, conductors 41, 164 and 165 to one terminal of the motor D, and from the other terminal of said motor, through conductors 166 and 167 to supply lead 164. Under the assumed condition of the hand switch 162, the connecting wires 169 and 170 of the motor E are connected respectively to wires 164 and 167, thus placing the two motors D and E in parallel and both under the control of the switch 38. Thus, with the manual switch 162 in the full line position, each closing of the switch 38 will start both motors D and E, the former to supply liquid to the tank A and the latter to start the compresser K.

Thus, with the arrangement shown in the diagram, a refrigerant is supplied to the heat exchange elements B, which thereupon become cooling elements, and at the time the refrigerant is being supplied to the cooling elements, water is being forced by the pump P into the distributor C and thence over the elements B. Thus, the water is cooled step by step as it passes down over the elements B. Preferably, as the water reaches the lower ends of the elements B, its temperature is reduced to a point just above freezing. Thus, there can be no coating of the elements or adjacent parts with ice. At the time the water is thus being progressively cooled, it is being subjected to the carbon dioxide gas supplied through pipe 30, regulator 31 and pipe 32 from the source of supply G. As before stated, gas under pressure is ordinarily supplied to the tank A, although there may be cases where low carbonation is required and the pressure will be negligible. On the other hand, in some instances the gas pressure may be as high as 100 pounds per square inch. It therefore follows that the tank must ordinarily be strong in construction, capable of withstanding as much as, say, 300 pounds pressure per square inch. It is in fact ordinarily a pressure tank. It should also be noted that when the tank is filled with gas, the water flowing over the cooling elements, descends in film form through an atmosphere of the gas. This means that the water, at the time it leaves the elements B, has been subjected most thoroughly to the envelope about its film streams as they descended, and has thus become saturated to a very high degree. Since the temperature is low, being as low as possible without the forming of ice, the saturation rests at a very high point. The water thus cooled and impregnated with gas flows, still in film formation, down into the bottom of the tank where it remains as an available supply of cooled and carbonated water.

As the water, thus cooled and carbonated, rests within the lower portion of the tank A, it has a level indicated by the line 21, previously mentioned, and the water, as it rises and falls, opens and closes the switch 38 with resulting changes either in the water supply alone or in the water and refrigerant supplies, according to the position of the manual switch 162, as before pointed out. When the water is thus cooled and carbonated and held in the collecting basin located at the bottom of the tank A, it is in readiness for removal through pipes 16 and 43 to a filler F or like apparatus.

This filler may take different forms and is here only diagrammatically shown. The pipe 33 interconnects the tank A and the upper portion of the filler F, and maintains the same pressure in both containers. From the filler the cooled and carbonated water is passed through an outlet 173 into bottles or like holders 174 properly prepared, according to the usual practice, with charges of syrup or other beverage ingredient. In some instances the pipe 33 may be omitted. This would be the case if the filler F were of such construction as not to require a supply of gas under pressure from the tank A.

Now it is obvious that if the elements B are not to be used as cooling elements, then the refrigerating equipment should be put out of service. This may be accomplished by simply stopping the compressor and keeping it inactive. Another way is to regulate the back pressure valve R through the stem 160 in such a way as to raise the temperature of the ammonia above that of the incoming water. Without furnishing a refrigerant to these elements, the water supplied by pump P might be water which had been previously cooled and then the function of the elements would be simply to present the water in good film formation so that there would be a good impregnation of the same by the surrounding carbonic acid gas.

It should be noted that in the equipment heretofore described, there are several factors which enter into the possible operations of the equipment. Thus, there is the matter of the pressure of the carbonic acid gas which constitutes the enveloping atmosphere in which the filming and cooling of the liquid takes place. This gas pressure may be variously regulated by the regulating apparatus typified by the regulator 31. Next, the cooling elements B provide a given area which may be calculated in advance and thus be predetermined. The area may be varied in many ways, as by changing the dimensions of each element or by adding or subtracting elements. Again, the volume of water flowed over that area may be varied in different ways, as before indicated when referring to the by-pass 79 around the pump P. Then, most of all, insofar as the present invention is concerned, is the supply of refrigerant and the adjustment of the same by varying the settings of the valve R located in the suction connections of the compressor K. By such changes in adjustment the pressure of the gasified ammonia or like refrigerant may be varied and thus the degree of refrigeration to which the liquid may be lowered, determined. The time during which the liquid is in contact with the heat exchange elements B is also important. Such time may be varied by changing the dimensions of the elements B by shortening the vertical dimension and lengthening the width and this may be done without changing the area.

Obviously, although the liquid commonly referred to as the liquid to be treated, is water, yet it should be understood that the liquid may vary greatly in character, as before mentioned. Thus, the liquid, if water, may be water which is ordinarily obtainable from city mains, springs or otherwise. It may also be water that is flavored or treated in special ways before being cooled and carbonated. Indeed, the liquids to be treated should include not only these waters but also beer, wine and the like.

Likewise in practicing the invention it should be kept in mind that many alterations and modifications in the details of the equipment herein disclosed may be made without departing from the spirit and scope of the invention.

This case is a continuation in part of my application Serial No. 195,743, filed March 14, 1938, and issued on August 20, 1940, as Patent No. 2,212,275.

I claim:

1. An apparatus of the class described, comprising an upright enclosing tank, an upright cooling element in said tank, said element having an exterior for contacting the liquid to be treated as it flows downward thereover and an interior for conducting the cooling medium from an inlet to an outlet, means for supplying the liquid to be treated to the exterior of the upper portion of said element, means for supplying and maintaining carbonic acid gas under pressure in said tank, the lower portion of the tank serving as a receiver for the treated liquid, means whereby treated liquid may be withdrawn from said receiver, means in said receiver cooperating with said liquid supplying means to maintain a liquid level in said receiver at all times below the refrigerating portion of said element, refrigerating means operative to introduce the medium into said element at said inlet and to withdraw the same therefrom through said outlet, and means for variously setting said refrigerating means to provide the refrigerant at different degrees of refrigeration.

2. A cooling and carbonating apparatus for use with a heat exchange medium readily vaporizable at ordinary temperatures, comprising an upright enclosing tank, an upright cooling element in said tank, said element having an exterior for contacting the liquid to be treated as it flows downward thereover and an interior for conducting the cooling medium therethrough from an inlet to an outlet, means for conducting said medium in liquid form to said inlet, means for receiving said medium from said outlet after it has been gasified, refrigerating means cooperating with said conducting and receiving means to change the medium from gas to liquid form, means for supplying and maintaining carbonic acid gas under pressure in said tank, means at the top of said tank for supplying to said element the liquid to be treated, the lower portion of said tank serving as a receiver for the treated liquid, means cooperating with said liquid delivering means to maintain a liquid level in said receiver at all times below the refrigerating portion of said element, means whereby treated liquid may be withdrawn from said receiver, and means for variously setting said refrigerating means to provide the refrigerant at different degrees of refrigeration.

3. A cooling and carbonating equipment for use with a heat exchange medium readily vaporizable at ordinary temperatures, comprising an enclosing tank, means for establishing an atmosphere of carbonic acid gas under pressure in said tank, an electromagnetically controlled liquid supply means for flowing a liquid to be treated into said tank, a heat exchange element in said tank to be used to film and cool the liquid thus flowed into said tank, the lower portion of said tank forming a storage chamber in which the cooled and carbonated liquid may be collected and held and said element having an exterior for contacting the liquid to be treated as it flows downward thereover and an interior for conducting the cooling medium therethrough from an inlet to an outlet, refrigerating means operative to receive the medium as a gas from said outlet, reduce it to a liquid and supply it as such to said element at said inlet, electromagnetically controlled means for controlling the operation of said refrigerating means, electric circuits for both of said electromagnetically controlled means, electric switching means located below the refrigerating portion of said element and dependent upon variations in the level of the liquid in said receiver, which level is at all times also below the refrigerating portion of said element, to vary said circuits to operate both of said electromagnetically controlled means, means for variously setting said refrigerating means to provide a refrigerant at different degrees of refrigeration, and means whereby the cooled and carbonated liquid may be removed from said receiver.

4. A cooling and carbonating apparatus of the class described, comprising an enclosing tank, means for establishing an atmosphere of carbonic acid gas under pressure in said tank, a cooling surface of predetermined area in said tank, means for flowing a predetermined volume of water over said surface area in the form of a film in a predetermined period of time, the water when thus flowing being both cooled and carbonated, means for supplying a refrigerant to cool said surface to in turn progressively cool the advancing film down to a predetermined degree attained at the moment it reaches the end of said cooling surface, the lower portion of said tank serving as a storage chamber, means whereby said cooled and carbonated liquid may be removed from said storage chamber, means whereby the level of the collected liquid in said storage chamber may be kept at all times below the level of said cooling surface, and means for variously setting said refrigerant supplying means to furnish the refrigerant at different degrees of refrigeration.

HARRY G. MOJONNIER.